United States Patent
Smith

(10) Patent No.: US 6,921,742 B2
(45) Date of Patent: Jul. 26, 2005

(54) WELL DRILLING FLUIDS

(75) Inventor: Kevin W. Smith, McMurray, PA (US)

(73) Assignee: Clearwater International, L.L.C., Houston, TX (US)

( * ) Notice: Subject to any disclaimer, the term of this patent is extended or adjusted under 35 U.S.C. 154(b) by 0 days.

(21) Appl. No.: 10/223,259

(22) Filed: Aug. 19, 2002

(65) Prior Publication Data

US 2003/0004068 A1 Jan. 2, 2003

Related U.S. Application Data

(62) Division of application No. 09/812,422, filed on Mar. 20, 2001, now Pat. No. 6,502,637.
(60) Provisional application No. 60/192,304, filed on Mar. 27, 2000.

(51) Int. Cl.$^7$ .............................. C09K 7/02; C09K 7/00
(52) U.S. Cl. ...................... 507/103; 507/118; 507/119; 507/120; 507/128; 507/129; 507/135; 507/141; 507/145
(58) Field of Search ................................. 507/103, 118, 507/119, 120, 128, 129, 135, 141, 145

(56) References Cited

U.S. PATENT DOCUMENTS

| | | | |
|---|---|---|---|
| 2,761,835 A | | 9/1956 | Brown |
| 2,761,836 A | | 9/1956 | Brown |
| 2,761,840 A | | 9/1956 | Brown et al. |
| 2,761,843 A | | 9/1956 | Brown |
| 3,349,032 A | | 10/1967 | Krieg |
| 4,164,979 A | | 8/1979 | Nooner |
| 4,366,071 A | | 12/1982 | McLaughlin et al. |
| 4,366,072 A | | 12/1982 | McLaughlin et al. |
| 4,447,342 A | | 5/1984 | Borchardt et al. |
| 4,536,297 A | * | 8/1985 | Loftin et al. ................. 507/121 |
| 4,647,859 A | | 3/1987 | Son et al. |
| 4,693,639 A | | 9/1987 | Hollenbeak et al. ........ 405/263 |
| 4,841,066 A | * | 6/1989 | Goertz et al. ............ 548/335.1 |
| 4,842,073 A | | 6/1989 | Himes et al. |
| 4,900,457 A | * | 2/1990 | Clarke-Sturman et al. .. 507/103 |
| 5,211,239 A | | 5/1993 | Thomas et al. |
| 5,363,918 A | | 11/1994 | Cowan et al. ............... 166/295 |
| 5,620,947 A | | 4/1997 | Elward-Berry |
| 5,635,458 A | * | 6/1997 | Lee et al. .................... 507/240 |
| 5,785,747 A | * | 7/1998 | Vollmer et al. .......... 106/194.2 |
| 6,006,831 A | * | 12/1999 | Schlemmer et al. ..... 166/250.01 |
| 6,100,222 A | * | 8/2000 | Vollmer et al. ............. 507/113 |
| 6,124,244 A | | 9/2000 | Murphey ..................... 507/111 |
| 6,359,040 B1 | * | 3/2002 | Burdick ........................ 524/43 |
| 6,569,348 B1 | * | 5/2003 | Smith et al. .................. 252/70 |
| 6,689,204 B2 | * | 2/2004 | Stanley .................. 106/287.17 |
| 2003/0221825 A1 | * | 12/2003 | Smith et al. ........... 166/250.01 |

FOREIGN PATENT DOCUMENTS

| | | | |
|---|---|---|---|
| CA | 2 374 486 | 11/2000 | ............ C09K/7/02 |
| WO | WO 95/14066 | 5/1995 | |

OTHER PUBLICATIONS

Steiger, Ronald P., "Fundamentals and Use of Potassium/Polymer Drilling Fluids . . . ," SPE 10100, Society of Petroleum Engineers, p. 1661–1670, (Aug. 28, 1982).

R.E. Himes, E.F. Vinson, D.E. Simon, "Clay Stabilization in Low Permeability Formations," SPE 18881, Society of Petroleum Engineers, p. 507–516, (Mar. 28, 1989).

Thomas W. Beihoffer et al, "Cationic Polymer Drilling Fluid Can Sometimes Replace Oil–Based Mud," Oil & Gas Journal, p. 47–52, (Mar. 16, 1992).

Siv K. Howard, "Formate Brines for Drilling and Completion: State of the Art," SPE 30498, Society of Petroleum Engineers (Dallas, TX), (Oct. 22, 1995).

\* cited by examiner

*Primary Examiner*—Philip C. Tucker
(74) *Attorney, Agent, or Firm*—Moser, Patterson & Sheridan

(57) ABSTRACT

Clay is stabilized in the drilling of wells and other formation treatment for hydrocarbon production by the addition to the drilling or other fluid fluid of potassium formate together with a cationic formation control additive.

24 Claims, No Drawings

WELL DRILLING FLUIDS

RELATED APPLICATION

This application is a division of application Ser. No. 09/812,422 filed Mar. 20, 2001, now U.S. Pat. No. 6,502,637 B2, based upon provisional application 60/192,304 filed Mar. 27, 2000, and claims benefit of its disclosure, priority date and filing date.

TECHNICAL FIELD

This application relates to the drilling of wells in the production of oil, gas and other fluids from underground formations, and particularly to the stabilization of boreholes drilled for the production of hydrocarbons. It includes the treatment of shale and clay in situ to prevent swelling caused by the absorption of water from drilling fluids.

BACKGROUND OF THE INVENTION

A good description of the problem which this invention addresses in the context of formation drilling may be found in an article by Thomas W. Beihoffer et al in the May 16, 1992 Oil & Gas Journal, page 47 et seq., entitled "Cationic Polymer Drilling Fluid Can Sometimes Replace Oil-based Mud." As stated therein, "(S)hales can become unstable when they react with water in the drilling fluid. These reactive shales contain clays that have been dehydrated over geologic time by overburden pressure. When the formation is exposed, the clays osmotically imbibe water from the drilling fluid. This leads to swelling of the shale, induced stresses, loss of mechanical strength, and shale failure." Shale crumbling into the borehole ("sloughing") can ultimately place a burden on the drill bit which makes it impossible to retrieve.

Salts such as potassium chloride have been widely used in drilling treatments to convert the formation material from the sodium form by ion exchange to, for example, the potassium form which is less vulnerable to swelling; also the use of high concentrations of potassium salts affects the osmotic balance and tends to inhibit the flow of water away from the high potassium salt concentrations into the shale. However, it is difficult to maintain the required high concentrations of potassium salts in the drilling fluids. In addition, the physical introduction of such salts causes difficulties with the preparation of the viscosifying materials typically used for drilling. Inorganic salts can also have a harmful effect on the environment if released.

As background for the present disclosure, I have assembled prior art references representative of three general types of amine and quaternary ammonium cation sources which have been suggested for clay treatment in hydrocarbon recovery. These are (a) single-site quaternaries and amines, (b) compounds having a few (two to about six) amine or quaternary ammonium cation sites, which I have called "oligocationic", and (c) quaternary ammonium or amine polymers, which may have from about six to thousands of cationic sites. The entire specifications of all of the patents set forth below are incorporated by reference, as the cationic materials described therein are useful in my invention.
A. Single-Site Quaternaries and Amines: Brown U.S. Pat. No. 2,761,835, Brown U.S. Pat. No. 2,761,840, Brown U.S. Pat. No. 2,761,836, Himes et al U.S. Pat. No. 4,842,073, Thomas and Smith U.S. Pat. No. 5,211,239.
B. Oligocationics: Brown U.S. Pat. No. 2,761,843; Krieg U.S. Pat. No. 3,349,032.
C. Polycationics: Borchardt et al U.S. Pat. No. 4,447,342, McLaughlin et al U.S. Pat. No. 4,374,739 McLaughlin et al U.S. Pat. No. 4,366,071.

SUMMARY OF THE INVENTION

My invention includes the use of combinations of potassium formate with various cationic materials, for the treatment of clay and shale in subterranean formations during drilling and otherwise for the stabilization of clay and clay-containing shale. For purposes of this patent application, it should be noted that all of the above identified patents incorporated by reference address problems similar to the problem I address. Each of the patents employs cationic formation control additives for drilling fluids to help control the swelling and sloughing of shale and clay contacted by aqueous drilling and other formation treating fluids. The contexts of use of such additives and the techniques for employing them as described in those patents are entirely consistent with and compatible with my invention. That is, I employ my own combination of additives in drilling fluids and otherwise to treat shale and clay to control swelling and sloughing.

Although the entire specifications of the above listed patents are incorporated by reference, to help in defining the materials useful in the present invention, I refer specifically to parts of the above identified patents, namely:

Brown U.S. Pat. No. 2,761,835 columns 3–10, Brown U.S. Pat. No. 2,761,840 columns 5–6, Brown U.S. Pat. No. 2,761,836 columns 5–6, Himes and Vinson U.S. Pat. No. 4,842,073 columns 1–10, Thomas and Smith U.S. Pat. No. 5,211,239 columns 1–2, Brown U.S. Pat. No. 2,761,843 columns 3–6, Krieg U.S. Pat. No. 3,349,032 columns 3–12, McLaughlin et al U.S. Pat. No. 4,366,071 columns 7–14, and Borchardt et al U.S. Pat. No. 4,447,342 columns 17–20.

It will be seen from these passages and excerpts (the full disclosures of the patents, as indicated above, are incorporated in their entireties) that the three general types of cationic materials I may use in my invention for the stabilization of clay in subterranean formations are single-site cationics, oligocationics, and polycationics. Together they may be referred to herein as "cationic formation control additives."Although cationics derived from sulfur, phosphorous and other elements capable of forming water-soluble cationic sites are effective and included in my invention, I prefer to use amine or ammonium-based cations. Thus the cationic portion of my clay treatment composition is preferably an amine or ammonium based (succinctly, "nitrogen-based") cationic material. I may use any of the cationic materials described in the above identified patents.

The single site amine and quaternaries useful as cationic formation control additives in my invention include di-, tri, and tetra-alkyl substituted amine and ammonium compounds wherein the alkyl groups include from 3 to 8 carbon atoms (Brown U.S. Pat. No. 2,761,835); substituted pyridine, pyridinium, morpholine and morphilinium compounds having from 1 to 6 carbon atoms in one or more substituent groups (Brown U.S. Pat. No. 2,761,840), additional heterocyclic nitrogen compounds such as histamine, imidazoles and substututed imidazoles, piperazines, piperidines, vinyl pyridines, and the like as described in Brown U.S. Pat. No. 2,761,836, the trialkylphenylammonium halides, dialkylmorpholinium halides and epihalohydrin derivatives described by Himes et al in the U.S. Pat. No. 4,842,073 patent, and the allyl ammonium compounds of the formula $(CH_2=CHCH_2)_n N^+(CH_3)_{4-n} X^-$ where $X^-$ is any anion which does not adversely react with the formation or the treatment fluid, described by Thomas and Smith in U.S. Pat. No. 5,211,239. Preferred single site quaternaries are diallyl dimethyl ammonium chloride (that is, the above formula where n=2 and $X^-$ is $Cl^-$), and tetramethyl ammonium chloride, sometimes referred to as TMAC.

Oligocationics useful as cationic formation control additives in my invention include di- and polyamines (up to 100 nitrogens) substituted with alkyl groups having up to 12 carbon atoms (one or more of the nitrogens may be quaternized) as described by Brown in U.S. Pat. No. 2,761,843, and polyquaternaries described by Krieg in U.S. Pat. No. 3,349,032, namely alkyl aryl, and alkaryl bis- and polyquaternaries wherein two quaternary ammonium nitrogens are connected by various connecting groups having from 2–10 carbon atoms.

Polyquaternary (cationic) formation control additives useful in my invention include those described by McLaughlin in the U.S. Pat. Nos. 4,366,071 and 4,374,739 patents, namely polymers containing repeating groups having pendant quaternary nitrogen atoms wherein the quaternizing moieties are usually alkyl groups but which can include other groups capable of combining with the nitrogen and resulting in the quaternized state. I may also use any of the numerous polymers including quaternized nitrogen atoms which are integral to the polymer backbone, and other polymers having repeating quaternized units, as described by Borchardt in the '342 patent. Nitrogen-based cationic moieties may be interspersed with and/or copolymerized with up to 65% by weight (preferably 1% to 65% by weight) nonionics such as acrylamide and even some anionics such as acrylic acid or hydrolyzed acrylamide. Molecular weights of the polymers may be quite high—up to a million or more. Such copolymers are included in my definition of polycationic formation control additives useful in my invention.

Preferred anions for association with the quaternized nitrogen atoms are halide anions, particularly chloride ions, which readily dissociate in the aqueous drilling or other formation treatment fluid, but any anions, including formate anions, may be used which will not interfere with the purposes of the formation treatment. Persons skilled in the art may wish to review the various anions mentioned in the above incorporated patents.

Thus it is seen that a cationic formation control additive useful in my invention is a material having from one to hundreds or thousands of cationic sites, generally either amines or quaternized amines, but may include other cationic or quaternized sites such as phosphonium or sulfonium groups.

I employ potassium formate together with a cationic formation control additive. The potassium formate may be added to the formation treating or drilling fluid before or after the cationic formation control additive, or may be made in situ by the reaction of potassium hydroxide and formic acid. The potassium hydroxide and formic acid may be added in any order, separately or together, before or after the addition of the cationic formation control additive, and need not be added in exact molar proportions. Any effective amount of the combination of potassium formate and formation control additive may be used, but I prefer to use ratios of potassium formate to formation control additive of 25:75 to 75:25 by weight in the solution, in combined concentrations of at least 0.001% by weight in the drilling or other formation treatment fluid.

Following are results from a clay pack flow test and a capillary suction test.

| Test products | Elapsed time → | start | 1 minute | 3 minutes | 5 min | 10 min | CST time |
|---|---|---|---|---|---|---|---|
| Fresh water | | 5 | 15 | 17 | 23 | 25 | 225.2 |
| 2% KCl | | 15 | 87 | 175 | | | 102 |
| 1% KCl and 12 GPT KCOOH | | 19 | 80 | 132 | 172 | | 36.1 |
| poly(DADMAC) 2 GPT | | 26 | 90 | 140 | 185 | | 38.3 |
| poly(DADMAC) + KCOOH 2 GPT | | 21 | 83 | 132 | 170 | 212 | 45.6 |
| poly(DADMAC) 1 GPT | | 22 | 52 | 72 | 86 | 112 | 63.8 |
| poly(DADMAC) + KCOOH 1 GPT | | 21 | 74 | 112 | 140 | 179 | 40.9 |
| poly(DADMAC) 0.5 GPT | | 5 | 21 | 28 | 34 | 47 | 224.6 |
| poly(DADMAC) + KCOOH 0.5 GPT | | 18 | 55 | 80 | 107 | 146 | 58.6 |
| LMWP (DADMAC) 2 GPT | | 14 | 42 | 64 | 82 | 107 | 68.4 |
| LMWP (DADMAC) 2 GPT + KCOOH | | 19 | 64 | 83 | 118 | 156 | 57 |
| HMWP (DADMAC/AA) 2 GPT | | 8 | 26 | 38 | 48 | 60 | 165.8 |
| HMWP (DADMAC/AA) + KCOOH 2 GPT | | 17 | 48 | 71 | 88 | 114 | 60.6 |
| Monomer (DADMAC) 2 GPT | | 2 | 17 | 22 | 30 | 42 | 239.6 |
| KCOOH (37%) 2 GPT | | 7 | 25 | 31 | 41 | 51 | 168.7 |
| Champion TMAC 2 GPT | | 1 | 36 | 63 | 75 | 109 | 146.4 |
| Champion TMAC 1 GPT | | 3 | 23 | 33 | 39 | 47 | 263.9 |
| TMAC 1 GPT + 12 GPT KCOOH | | 15 | 59 | 95 | 124 | 172 | 68.9 |

Poly(DADMAC) = 25% poly(diallyldimethyl ammonium chloride)
TMAC = 25% by weight tetramethyl ammonium chloride
GPT = gallons of the test additive(s) solution per thousand gallons of formation treatment (drilling) fluid
HMWP = 15.5% by weight of the indicated high molecular weight polymer
LMWP = 14.5% by weight of the indicated low molecular weight polymer
KCOOH = 18% by weight aqueous solution From the above table, it can be seen that the addition of potassium formate to the formation control additives improved the results considerably. In the clay pack flow test, where the higher volumes at a given time indicate better clay stability, the addition of a small amount of potassium formate increased the volume throughput for a given polymer concentration. In fact, adding the potassium formate improved the performance of a polymer more than using twice the concentration of the polymer alone. For example, the poly(DADMAC) at 1 GPT treatment had a volume at 10 minutes of 112 ml. The same polymer, when combined with potassium formate and treated at 0.5 GPT (half the original polymer concentration), had a volume of 146 ml, indicating better clay stability and a possible synergistic effect from the addition of the potassium formate.

Similar results are obtained from the CST data. In this test, a constant volume of treated fluid is flowed across a clay and filter medium. The lower the time for the volume to pass through, the better the clay stabilization. The addition of potassium formate lowers the CST time in nearly all cases, indicating a benefit in performance from the formate. The presence of potassium formate, as in the clay pack flow test, also indicates synergy with the polymer. The CST time for the poly(DADMAC)+potassium formate at 0.5 GPT is lower than the time for the higher concentration (1 GPT) of polymer alone. Thus, the addition of potassium formate is sufficiently beneficial to allow reducing the polymer by half, and still increase the performance.

In both the clay pack flow test and the CST, the polymer combinations with the potassium formate were also better than the effect of formate alone. The CST result and the clay pack flow test volume for the 2 GPT of 37% potassium formate (by itself) were both worse than even the low treatment levels of the polymer/formate combinations, but better than some of the polymer treatments alone. This indicates that, while the potassium formate is effective alone and better than some polymer-only treatments, its performance is enhanced when combined with the formation control additives.

What is claimed is:

1. A well drilling fluid comprising potassium formate and a cationic formation control additive comprising tetramethylammonium chloride.

2. The well drilling fluid of claim 1, wherein the potassium formate is generated in situ from potassium hydroxide and formic acid.

3. The well drilling fluid of claim 2, wherein the cationic formation control additive and the potassium formate are present in a weight ratio from about 75:25 to about 25:75.

4. The well drilling fluid of claim 3, wherein a combined concentration of the cationic formation control additive and the potassium formate is at least 0.001% by weight of the well drilling fluid.

5. An aqueous well drilling fluid comprising a cationic formation control additive and potassium formate, wherein the cationic formation control additive is a copolymer of dimethyl diallyl ammonium chloride and about 1% to about 65% by weight acrylic acid or hydrolyzed acrylamide.

6. The aqueous well drilling fluid of claim 5, wherein the potassium formate is generated in situ from potassium hydroxide and formic acid.

7. The aqueous well drilling fluid of claim 6, wherein a combined concentration of the cationic formation control additive and the potassium formate is at least 0.001% by weight of the aqueous well drilling fluid.

8. An aqueous well drilling fluid comprising a cationic formation control additive and potassium formate, wherein the cationic formation control additive is a homopolymer of dimethyl diallyl ammonium chloride.

9. The aqueous well drilling fluid of claim 8, wherein the cationic formation control additive and the potassium formate are present in a weight ratio from about 75:25 to about 25:75.

10. An aqueous well drilling fluid comprising a cationic formation control additive and potassium formate, wherein the cationic formation control additive is an oligocationic compound.

11. The well drilling fluid of claim 7, wherein the cationic formation control additive and the potassium formate are present in a weight ratio from about 75:25 to about 25:75.

12. The well drilling fluid of claim 8, wherein the potassium formate is generated in situ from potassium hydroxide and formic acid.

13. The well drilling fluid of claim 12, wherein a combined concentration of the cationic formation control additive and the potassium formate is at least 0.001% by weight of the well drilling fluid.

14. The well drilling fluid of claim 10, wherein the potassium formate is generated in situ from potassium hydroxide and formic acid.

15. The well drilling fluid of claim 14, wherein the cationic formation control additive and the potassium formate are present in a weight ratio from about 75:25 to about 25:75.

16. The well drilling fluid of claim 15, wherein a combined concentration of the cationic formation control additive and the potassium formate is at least 0.001% by weight of the well drilling fluid.

17. The well drilling fluid of claim 10, wherein the cationic formation control additive is a phosphonium compound.

18. The well drilling fluid of claim 17, wherein the potassium formate is generated in situ from potassium hydroxide and formic acid.

19. The well drilling fluid of claim 18, wherein the cationic formation control additive and the potassium formate are present in a weight ratio from about 75:25 to about 25:75.

20. The well drilling fluid of claim 19, wherein a combined concentration of the cationic formation control additive and the potassium formate is at least 0.001% by weight of the well drilling fluid.

21. The well drilling fluid of claim 10, wherein the cationic formation control additive is a sulfonium compound.

22. The well drilling fluid of claim 21, wherein the potassium formate is generated in situ from potassium hydroxide and formic acid.

23. The well drilling fluid of claim 22, wherein the cationic formation control additive and the potassium formate are present in a weight ratio from about 75:25 to about 25:75.

24. The well drilling fluid of claim 23, wherein a combined concentration of the cationic formation control additive and the potassium formate is at least 0.001% by weight of the well drilling fluid.

* * * * *